United States Patent
Görlich

[11] Patent Number: 6,045,740
[45] Date of Patent: Apr. 4, 2000

[54] PROCESS AND DEVICE FOR MANUFACTURING INJECTION-MOLDED PARTS FROM PLASTIC MATERIAL

[75] Inventor: Rudolf Görlich, Bad Friedrichshall, Germany

[73] Assignee: Guenther Heisskanaltechnik GmbH, Frankenberg, Germany

[21] Appl. No.: 08/908,812

[22] Filed: Aug. 8, 1997

[30] Foreign Application Priority Data

Aug. 10, 1996 [DE] Germany ............... 196 32 315

[51] Int. Cl.[7] .................................. B29C 45/02
[52] U.S. Cl. ..................... 264/297.2; 264/328.4; 264/328.8; 264/328.14; 425/549; 425/557; 425/558; 425/570; 425/572
[58] Field of Search ............. 264/297.2, 328.4, 264/328.8, 328.14, 328.15; 425/549, 557, 558, 570, 572, 588

[56] References Cited

U.S. PATENT DOCUMENTS

| | | | |
|---|---|---|---|
| 3,861,841 | 1/1975 | Hanning | 425/573 |
| 3,891,362 | 6/1975 | DeVita | 425/573 |
| 4,080,147 | 3/1978 | Dumortier | 425/557 |
| 4,090,837 | 5/1978 | Balevski et al. | 425/588 |
| 4,734,243 | 3/1988 | Kohama et al. | 425/588 |
| 5,028,226 | 7/1991 | De'ath et al. | 425/572 |
| 5,069,840 | 12/1991 | Arnott . | |
| 5,078,589 | 1/1992 | Osuna-Diaz | 425/588 |
| 5,087,190 | 2/1992 | Laghi | 425/588 |
| 5,200,207 | 4/1993 | Akselrud et al. | 425/572 |
| 5,662,856 | 9/1997 | Wunderlich | 264/297.2 |
| 5,698,242 | 12/1997 | Chen et al. | 425/588 |

FOREIGN PATENT DOCUMENTS

| | | |
|---|---|---|
| 0 393 389 | 10/1990 | European Pat. Off. . |
| 0 824 057 | 2/1998 | European Pat. Off. . |
| 26 49 265 | 5/1977 | Germany . |
| 4133435A1 | 4/1993 | Germany . |
| 196 32 315 | 5/1998 | Germany . |

OTHER PUBLICATIONS

Plastiques Modernes Et Elastomers, vol. 35 (1983), p. 41 entitled "Moules a injection directe".
Japanese Abstract No. 58 167146, vol. 8, No. 2 (M–266), Oct. 3, 1983.
Japanese Abstracts No. 02 178010, vol. 14, No. 447 (M–1029) Jul. 11, 1990.

*Primary Examiner*—Jill L. Heitbrink
*Attorney, Agent, or Firm*—Evenson, McKeown, Edwards & Lenahan, PLLC

[57] ABSTRACT

In a process for the simultaneous manufacturing of a plurality of injection-molded micro parts from thermoplastic or cross-linking polymers in an injection molding tool, an injection device is provided which has injection cylinders, injection pistons and temperable antechambers. The plastic melt coming from a conveyor worm, by way of temperable sprues, first arrives in the antechambers and, in a second step, is supplied by the injection pistons by way of the injection nozzles to the mold cavities. The mold cavities are filled independently of one another. The co-solidifying runners are eliminated, and it is possible to manufacture particularly small parts with a low injection volume at particularly reasonable cost.

26 Claims, 3 Drawing Sheets

PROCESS AND DEVICE FOR MANUFACTURING INJECTION-MOLDED PARTS FROM PLASTIC MATERIAL

BACKGROUND AND SUMMARY OF THE INVENTION

The invention relates to a process and device for the simultaneous manufacturing of a plurality of injection-molded micro parts made from thermoplastic or cross-linking polymers in an injection molding tool having a sprue block with temperable channels for the free-flowing material and having a mold block with a plurality of mold cavities.

For the manufacturing of injection-molded parts made from polymer materials, mold part tools are used which are inserted into injection molding machines. In the case of smaller plastic parts, it is customary to provide several identical mold cavities in one injection-molding tool. Conventionally, the mold cavities are filled with a star-shaped or comb-shaped runner. The material in this runner solidifies together with the mold part and can be reused only partially and only after a regranulation process.

In the case of very small parts with a very low injection volume, as, for example, in the case of electronic components or micro system parts, a multiple of the effective volume is lost because of this simultaneously solidifying runner. Particularly in the case of expensive high-capacity polymer materials, this results in an unacceptable price increase for the product. In the case of problematic additives (such as flame proofing agents), additional costs for the waste disposal must be taken into account.

In order to reduce the manufacturing costs per component, a number of mold cavities per tool is desirable which is as large as possible. However, particularly in the case of modern high-capacity polymer materials, a plurality of mold cavities in a tool has so far resulted in unsolvable filling problems because of unequal flow resistances and flow paths in the case of a central injection by way of the injection nozzle of the injection machine.

From U.S. Pat. No. 5,069,840, a device is known for the counterpressure or oscillation process by means of which the strength-reducing effect of joint lines in the mold part is to be reduced. When there are several sprues per mold part, joint lines are unavoidable. In the case of the suggested process, at least two injection nozzles for each mold cavity are required for filling the mold part. The molding material is simultaneously supplied to the mold cavity and two pressure cylinders by the feeding device. When these are filled with molding material, the connection to the feeding device is closed by valves and the pistons of the pressure cylinders are moved in an alternate fashion. As a result, the molding compound in the mold cavity will oscillate to the point of solidification and the solidification layers are displaced with respect to one another. This increases the strength of the joint lines. The process is therefore suitable only for larger mold parts which require several sprues and the space requirement of the system is too large for very small mold parts.

German Patent Document DE 41 33 435 A1 describes a process in the case of which, by means of plastic waste, mold parts are to be produced which are so large that the extruder capacity is not sufficient for filling the mold cavity in the required time period. In a heated intermediate storage device with a pressure cylinder, an amount of molten material is collected which is sufficient for filling a mold. The smallest mold parts present exactly the opposite problem. The extruder delivers too much material so that an economical manufacturing is possible only if, by the simultaneous manufacturing of a sufficiently large number of mold parts, a minimal amount of material can be conveyed.

It is therefore an object of the present invention to provide a process and a device for manufacturing micro parts without a sprue and with a large number of mold cavities per tool on conventional injection machines.

According to the invention, this object is achieved by a system wherein a single outlet duct of an injection nozzle is assigned to each mold cavity and the material conveyed by a conveyor worm is charged by way of the sprues directly into antechambers having volumes corresponding to assigned mold cavities, the material in this step not reaching the mold cavities, and wherein, in a second step, injection pistons press the material by way of injection nozzles into the mold cavities, the injection pressure generated by the injection pistons being independent of the conveying pressure of the conveyor worm.

The process according to the invention eliminates the dependence of the filling parameters on the central course of the molding pressure of the injection machine and their unavoidable changes in the course of the sprue runners. By means of the insertion of the injection cylinders according to the invention into the melt flow from the injection machine to the mold cavity, completely new manufacturing possibilities are achieved in polymer processing.

The injection machine first presses the material by way of the sprues into the antechambers of the injection cylinders. The filling of the antechamber presents no problems because its geometrical shape is simple and without any thin-walled contours. The material is then injected by means of the piston of the injection cylinder under a high pressure directly into the mold cavity.

By means of this pressure-related and flow-related uncoupling, the filling and processing parameters of the material can be optimized for each of the mold cavities because the. injection pressure for the mold filling will no longer come centrally from the injection machine but decentrally from the injection cylinders and the material arrives directly in the mold cavity. The pistons of the injection cylinders can be operated individually or jointly, in which case the operating force can be generated hydraulically, pneumatically or mechanically. In the case of a joint operation, it is advantageous to uncouple the individual pistons by means of springs in order to compensate tolerances of all types.

The sprues and the injection cylinders are tempered corresponding to the requirements of the polymer materials to be processed. In the processing of thermoplastics, the sprues and the injection cylinders are tempered and constructed as so-called heating ducts so that the material can be injected into the mold cavity in a liquid state and under high pressure. In contrast, the mold block with the mold cavities is cooled so that the melt is solidified and can be removed from the mold. The processing of cross-linking polymers, such as rubber, requires a reverse tempering where the sprue runner is cooled and the mold block is heated so that the plastic material will not cross-link before it reaches the mold cavity and thus becomes firm. If the tempering is designed correspondingly, the process and the device according to the invention can be used for the tempering of both polymer types.

The injection cylinders may have a very slim construction, whereby a high density per surface unit can be achieved in the arrangement and thus a high number of mold cavities per tool.

The tempering of the injection cylinders may take place individually or several injection cylinders are installed in a heat block which is tempered. The individual tempering results in a precision adjustment for each mold cavity, while, by means of the block tempering, a further densening of the arrangement and thus simpler apparatus-related expenditures can be achieved.

Other objects, advantages and novel features of the present invention will become apparent from the following detailed description of the invention when considered in conjunction with the accompanying drawings.

DETAILED DESCRIPTION OF THE DRAWINGS

Figure 1:
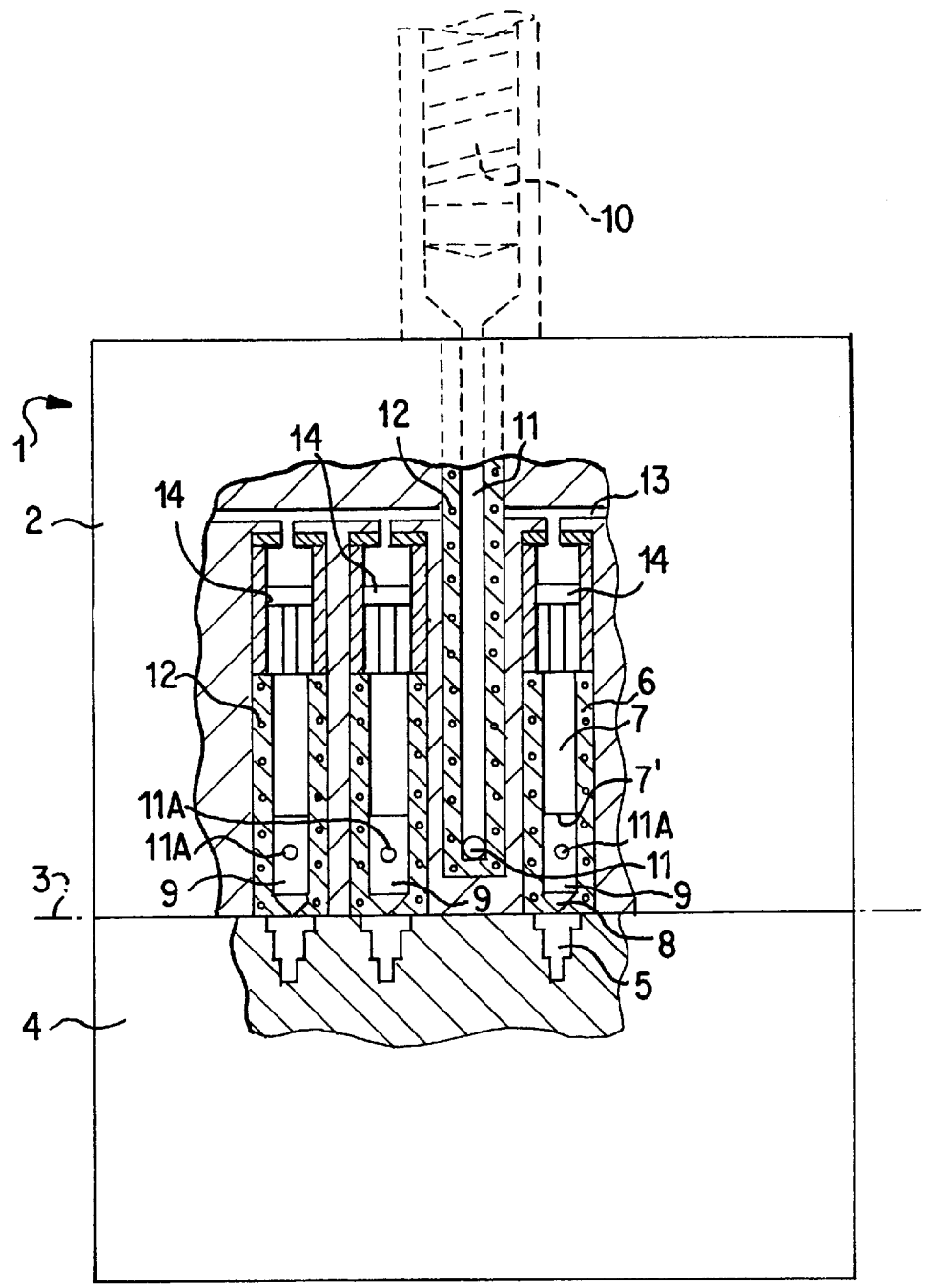
FIG. 1 is a schematic, partially sectional view of an injection device, constructed according to preferred embodiments of the present invention.

FIG. 1 illustrates an injection device 1 having a sprue block 2 which, during the injection operation is pressed on the junction plane 3 against a mold block 4. In this mold block 4, mold cavities 5 are situated for receiving the plastic melt. In the sprue block 2, injection cylinders 6 are arranged which extend to the junction plane 3 and in which injection pistons 7 are disposed in a displaceable manner. On the face of each injection cylinder 6 facing the junction plane 3, an injection nozzle 8 is situated which has a reduced cross-section. In the inoperative position, the injection piston 7 will now take up such a position in the injection cylinder 6 that, between the injection nozzle 8 and the face 7' of the injection piston 7 facing this injection nozzle 8, an antechamber 9 is formed which is used for receiving the plastic melt. This plastic melt is supplied to the antechamber 9 by the schematically illustrated conveyor worm 10 by way of temperable sprues 11 and schematically shown sprue openings 11A.

Tempering elements 12 in the form of heating or cooling elements are used for the tempering of the injection cylinders 6 and of the sprues 11.

For operating the injection pistons 7, feed pipes 13 are provided in which a pressure medium can be supplied to the respective injection cylinders 6. This pressure medium acts upon an operating piston 14 connected with the corresponding injection piston 7.

During the injection operation, the injection pistons 7 are first situated in the inoperative position illustrated in FIG. 1. The plastic melt supplied by the conveyor worm 10 is situated in the antechambers 9. After the operating pistons 14 are acted upon by the pressure medium, the injection pistons 7 are displaced in the direction of the injection nozzle 8 and convey the plastic melt situated in the respective antechamber 9 into the mold cavity 5.

After the conclusion of the injection operation, the injection pistons 7 are returned under the effect of the flowing-in plastic melt into their respective inoperative position, in which case the antechambers 9 are again filled with the plastic melt. The injection device 1 is thus ready again for a new cycle; the plastic melt in the antechambers 9 is in a processable tempered condition; and the mold parts in the mold cavities 5 assume their desired condition by means of the corresponding tempering.

Figure 2:
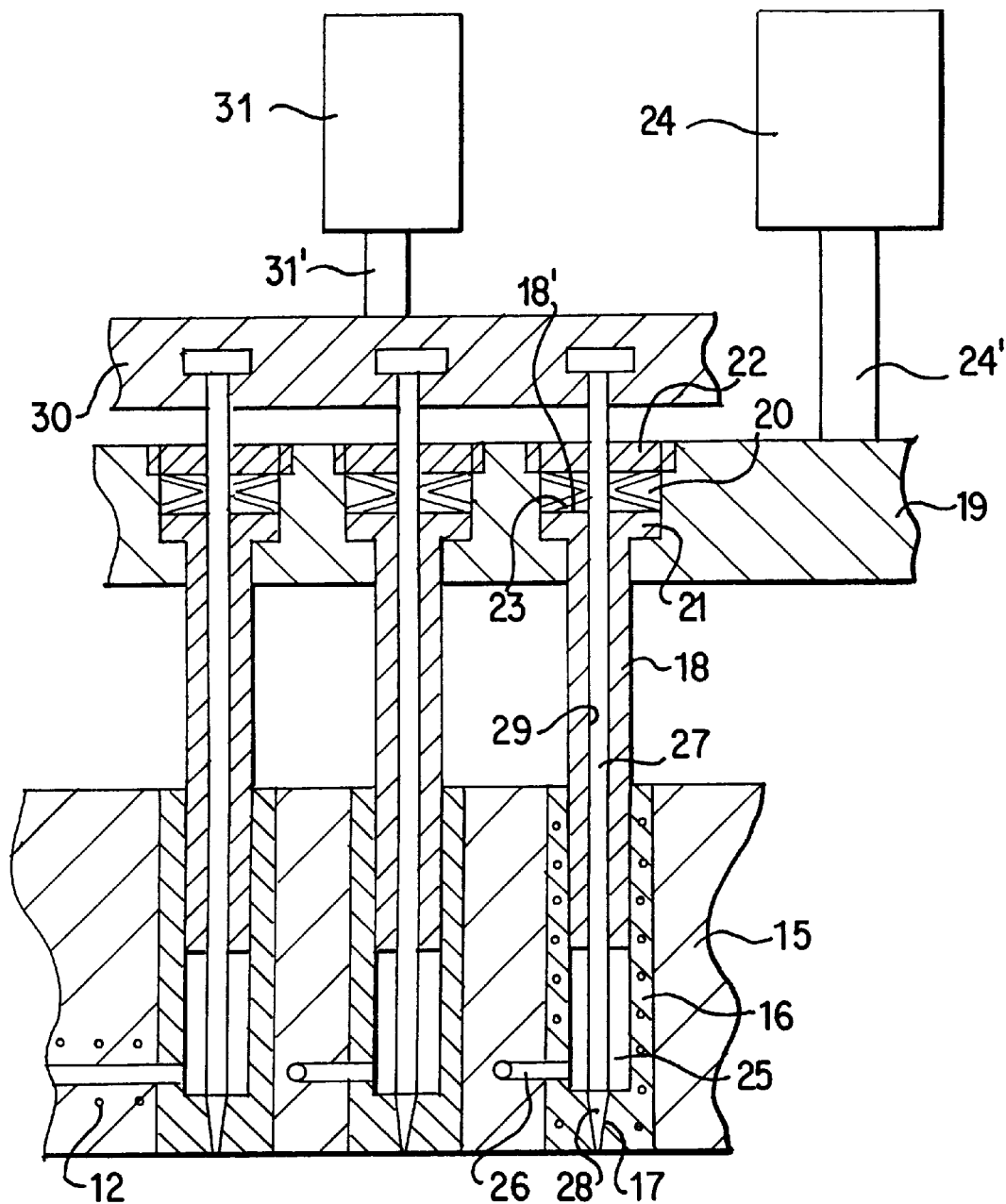
FIG. 2 is a schematic, partially sectional view of a second embodiment of an injection device.

FIG. 2 illustrates a second embodiment of the invention, in the case of which injection cylinders 16 are again arranged in the sprue block 15. They are again each provided with an injection nozzle 17 and one injection piston 18 respectively is displaceably disposed in their interior. A displaceable lifting beam 19 extends separately of the sprue block 15 and has blind hole bores 20 in which flanges 21 of the injection pistons 18 are disposed in a displaceable manner. The blind hole bores 20 can be closed by ring bolts 22, and an assembly of compensating springs 23 is arranged between the screws 22 and the flange 21. The lifting beam 19 is connected with the piston rod 24' of a lifting cylinder 24. In addition, also in this embodiment, an antechamber 25 is provided between the injection piston 18 and the injection nozzle 17, the plastic melt being suppliable to the antechamber 25 through temperable sprues 26.

In this embodiment, the injection nozzle 17 is closed in the inoperative position by means of a closing element 27 whose conical tip 28 engages in the also conical injection nozzle 17. The closing element 27 extends through a longitudinal bore 29 of the injection piston 18 to another lifting beam 30 which can be operated by the piston rod 31' of another lifting cylinder 31. The closing elements 27 are therefore fixedly connected with the lifting beam 30.

In this embodiment, the operation in principle takes place in the same manner as described in the case of the first embodiment but in the inoperative position the injection nozzles 17 are first closed. Before the initiation of the injection operation by the injection piston 18, however, the closing elements 27 are pulled up by the lifting beam 30 such that they release the injection nozzles 17. The injection operation takes place by operating the lifting beam 19 which displaces the injection piston 18 jointly so that the plastic melt emerges through the injection nozzles.

Compensating springs 23 have the purpose of mechanically uncoupling the individual injection pistons 18 from one another so that tolerances of all types are compensated. After the return of the injection pistons 18 and the entering of the tips 28 of the closing elements 27 into the injection nozzles 17, plastic melt will again enter the antechamber 25 through the sprues 26, and the injection device is ready for a new cycle.

Figure 3:
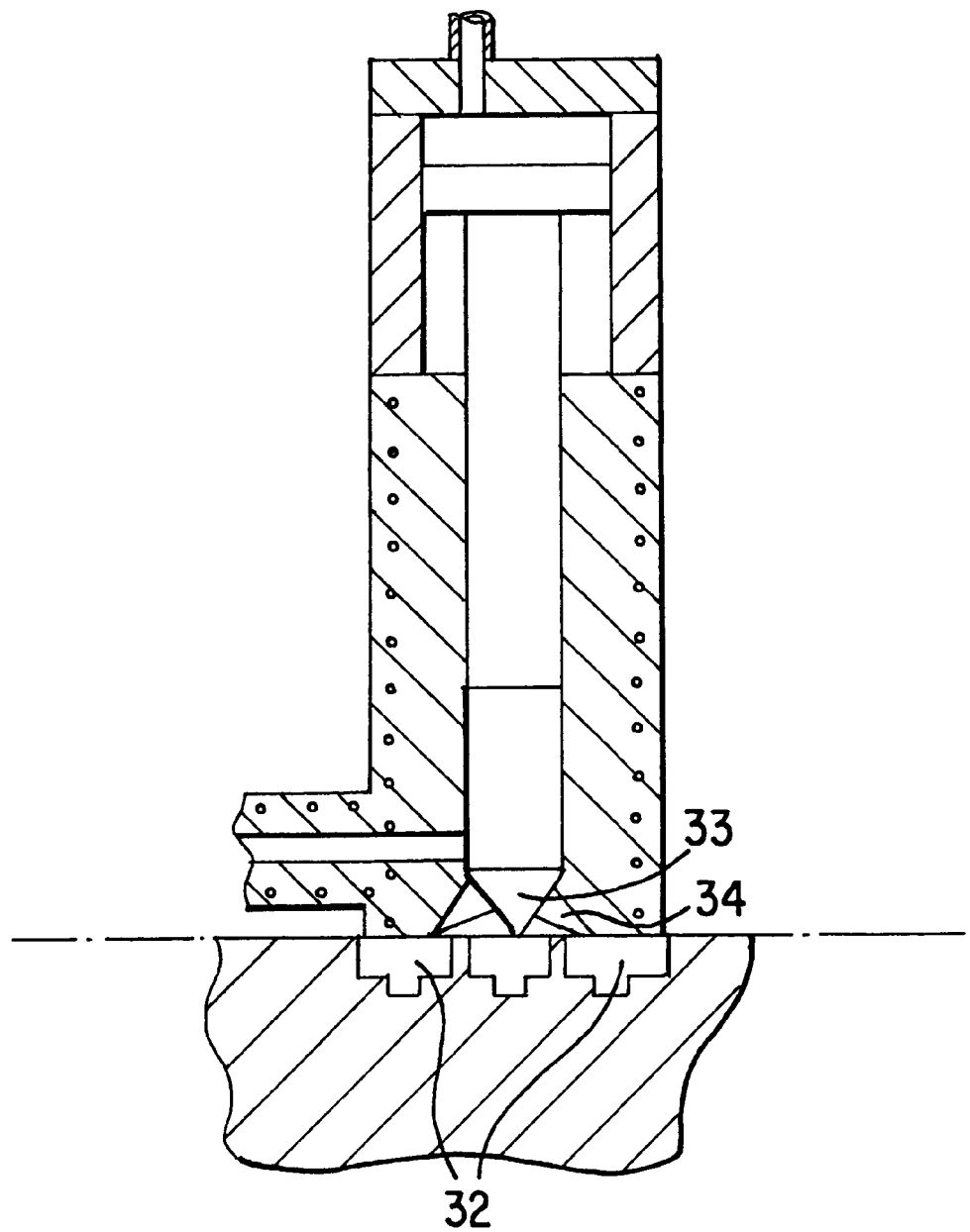
FIG. 3 is a sectional view of an embodiment of an injection device having a multiple nozzle.

FIG. 3 illustrates another embodiment of an injection device with mold cavities 32 which are so small that they can be serviced by one injection device. For this purpose, an injection nozzle 33 has multiple outlet ducts 34. Each outlet duct 34 leads into a mold cavity 32. According to certain preferred embodiments, a plurality of injection nozzles 33, with corresponding plural outlet ducts 34, are supplied from a single conveyor worm in a manner similar to the embodiments of FIGS. 1 and 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for the simultaneous manufacturing of a plurality of injection-molded micro parts in an injection molding tool having a sprue block with temperable channels for a free-flowing material and further having a mold block with a plurality of mold cavities, wherein a single outlet duct of an injection nozzle is assigned to each mold cavity and the material conveyed by a charging device is, in a first step, charged through open sprues, each of which directly couples the charging device to a respective antechamber having a volume corresponding to an assigned mold cavity, an outlet of the antechamber forming an inlet of the injection nozzle, said cavity not being reached by the material in this first step while the antechambers are charged jointly, wherein, in a second step, injection pistons arranged in the antechambers jointly press the material through the injection nozzles into the mold cavities to completely fill the mold cavities, the injection pressure generated by the injection pistons being independent of the conveying pressure of the charging device, and wherein the injection nozzles are closed after each injection by closing elements arranged in each of the injection pistons once the mold cavities are completely filled.

2. Process according to claim 1, wherein in the second step, the material is jointly pressed from the antechambers through the injection nozzles arranged directly adjacent the antechambers into the mold cavities, the sprue block being arranged directly adjacent the mold block.

3. Process according to claim 1, wherein the length of the sprues to each antechamber is freely selectable and has no influence on the filling of the mold cavity.

4. Process according to claim 1, wherein the material is supplied to the mold cavity only after the injection nozzles first held closed in an inoperative position via valve needles have been jointly opened.

5. Process according to claim 1, wherein the free-flowing material is one of a thermoplastic and cross-linking polymer material.

6. A process for simultaneously making a plurality of injection-molded micro parts in an injection molding tool having a sprue block and a mold block with a plurality of mold cavities, comprising:

charging a plurality of antechambers in the sprue block with a material to be molded with a single charging device via open sprues which first prevent said material from entering the mold cavities, the material being tempered in said antechambers each of which has a volume corresponding to an assigned mold cavity of the mold block, subsequently pressing the material from the respective antechambers jointly through directly adjacent injection nozzles into the respective assigned mold cavities to completely fill the mold cavities with an injection pressure independent of charging pressure used for charging the plurality of antechambers, and finally closing the injection nozzles after each injection by closing elements arranged within pressing pistons that slide in the injection nozzles once the mold cavities are completely filled.

7. A process according to claim 6, wherein said charging is accomplished with a single conveyor worm supplying said material by way of the sprues in the sprue block to said plurality of antechambers.

8. A process according to claim 6, wherein said pressing the material from the antechambers jointly into the mold cavities is accomplished with separate pressing pistons operating at respective ones of said separate antechambers which open into a plurality of said mold cavities.

9. Injection device for manufacturing a plurality of injection-molded micro-parts in an injection molding tool comprising a sprue block with temperable channels for a free-flowing material and a mold block with a plurality of mold cavities, wherein a single outlet from an injection nozzle is assigned to each mold cavity and the material conveyed by a charging device is, in a first step, charged through open sprues directly coupling into antechambers having volumes that correspond to assigned mold cavities which are not reached by the material in this first step while the antechambers are jointly charged, wherein injection pistons are arranged for jointly pressing the material, in a second step, through the injection nozzles into the mold cavities to completely fill the mold cavities at once, the injection pressure generated by the injection pistons being independent of the conveying pressure of the charging device, said injection device further comprising:
a plurality of injection cylinders;
a plurality of injection pistons, one of which is arranged in each of said injection cylinders;
a plurality of injection nozzles, one of which is arranged at one end of each of said injection cylinders; and
an operating device operatively coupled to the plurality of injection pistons;

wherein respective ones of the injection cylinders, the injection pistons and the injection nozzles are arranged in an axial alignment and form the antechambers, the sprue block containing a plurality of such axially aligned elements with axes parallel to one another to provide a high density of injection devices, the respective cylinders, pistons, and nozzles forming antechambers which are connected with the charging device by way of temperable open sprues, and wherein in an axially displaceable manner, a closing element is arranged in each of the injection pistons for closing an associated injection nozzle after the associated mold is completely filled.

10. Device according to claim 9, wherein each injection nozzle has several outlet ducts, each outlet duct having the single outlet leading into a mold cavity arranged directly adjacent the single outlet and wherein one closing element closes the several outlet-ducts of an injection nozzle.

11. Device according to claim 9, wherein one of said closing elements closes several outlet ducts associated with one injection nozzle.

12. Device according to claim 9, wherein the closing elements are displaceably disposed in a longitudinal bore of the associated injection piston, compensating springs being arranged at one end of the injection pistons opposite the antechambers.

13. Device according to claim 9, wherein a lifting beam arranged outside of the sprue block operatively displaces the closing elements in parallel.

14. Device according to claim 13, wherein compensating springs are arranged at one end of the injection pistons opposite the antechambers.

15. Device according to claim 9, wherein tempering elements are provided in the sprue block for holding the material at its processing temperature in the sprues and in the antechambers to the injections nozzles.

16. Device according to claim 15, wherein the tempering elements are each assigned to individual ones of said injection cylinders.

17. Device according to claim 15, wherein the tempering elements are provided for tempering the injection cylinders arranged in sprue blocks.

18. Device according to claim 9, wherein said antechambers are arranged directly adjacent the injection nozzles, and wherein the sprue block is directly adjacent the mold cavities of the mold block.

19. Injection device according to claim 9, wherein the material is one of a thermoplastic and cross-linking polymer material.

20. Device according to claim 9, wherein the pressure in each of the plurality of mold cavities is independent of the pressure in any other of the plurality of mold cavities.

21. Apparatus for simultaneously making a plurality of injection molded micro parts in an injection molding tool having a sprue block and a mold block with a plurality of mold cavities, comprising:

means for opening and closing injection nozzles;

a single charging device jointly charging a plurality of antechambers in the sprue block with a free-flowing material via open sprues while first preventing said material from entering the mold cavities by closing the injection nozzles, each of said antechambers having a volume corresponding to an assigned mold cavity of the mold block, and a plurality of jointly operated pressing devices subsequently pressing the material from the respective antechambers through directly adjacent injection nozzles into the respective assigned mold cavities with an injection pressure independent of the charging pressure used for charging the plurality of antechambers, said pressing devices including respective pressing pistons operable independently of said single charging device, wherein after the mold cavities are completely filled, said opening and closing means closes the nozzles.

22. Apparatus according to claim 21, wherein said single charging device is a conveyor worm.

23. Apparatus according to claim 21, wherein the injection nozzles include a plurality of densely packed nozzles for precise manufacture of the micro parts, the nozzles being flow-connected with the sprues arranged in the sprue block for feeding the material therethrough, each nozzle being temperature-controlled and in axial alignment with a valve needle that is guided within an injection piston slideably situated in an injection cylinder, wherein said injection pistons are jointly operable by a cylinder drive and wherein said valve needles are jointly operable by a cylinder-driven shifting mechanism.

24. Apparatus according to claim 21, wherein the pressure in each of the plurality of mold cavities is independent of the pressure in any other of the plurality of mold cavities.

25. An injection device for manufacturing a plurality of injection-molded micro parts, the injection device comprising:

a sprue block having temperable channels coupleable with a charging device for receiving molding material and a plurality of densely packed injectors, longitudinal axes of which are arranged in parallel to one another, each of said injectors comprising:

a hollow injection cylinder having first and second ends;

a piston having a first end guided inside the cylinder;

an injection nozzle arranged at the first end of the cylinder, wherein an antechamber is formed in the cylinder between the first end of the injection piston and the injection nozzle, an outlet of the antechamber being common with an inlet of the injection nozzle, said antechamber having a continuous cross-section; and a closing element longitudinally guided in an axially displaceable manner within the piston, said closing element being configured to close the inlet of the injection nozzle;

wherein said injectors are jointly operable to press the molding material into a corresponding mold cavity to completely fill the mold cavity.

26. Device according to claim 25, wherein the pressure in each of the plurality of mold cavities is independent of the pressure in any other of the plurality of mold cavities.

* * * * *